US008672283B2

(12) United States Patent  (10) Patent No.: US 8,672,283 B2
Chen et al.  (45) Date of Patent: Mar. 18, 2014

(54) PROJECTION DEVICE

(75) Inventors: Wei-Ju Chen, Hsin-Chu (TW);
Chi-Chen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 70 days.

(21) Appl. No.: 13/179,579

(22) Filed: Jul. 11, 2011

(65) Prior Publication Data

US 2012/0091306 A1   Apr. 19, 2012

(30) Foreign Application Priority Data

Oct. 18, 2010   (CN) .......................... 2010 1 0514756

(51) Int. Cl.
A47B 91/00 (2006.01)
A47B 95/00 (2006.01)

(52) U.S. Cl.
USPC ................. 248/349.1; 248/346.01; 248/309.1

(58) Field of Classification Search
USPC ................................. 248/349.1, 346.01, 309.1
See application file for complete search history.

(56) References Cited

U.S. PATENT DOCUMENTS

| 4,410,159 | A | * | 10/1983 | McVicker et al. | 248/179.1 |
| 5,398,903 | A | * | 3/1995 | Cho | 248/349.1 |
| 6,135,411 | A | * | 10/2000 | Shirasawa | 248/349.1 |
| 6,644,616 | B1 | * | 11/2003 | Tsukuda | 248/371 |
| 6,854,608 | B2 | * | 2/2005 | McNeeley et al. | 211/78 |
| 7,540,463 | B2 | * | 6/2009 | Tsuboi | 248/393 |
| 2007/0146651 | A1 | | 6/2007 | Lee et al. | |
| 2010/0039627 | A1 | | 2/2010 | Liu | |

FOREIGN PATENT DOCUMENTS

| CN | 2437946 | 7/2001 |
| CN | 201127077 | 10/2008 |
| CN | 201131013 | 10/2008 |
| CN | 201202940 | 3/2009 |
| CN | 201363519 | 12/2009 |
| CN | 101730434 | 6/2010 |
| CN | 201599537 | 10/2010 |
| EP | 1850052 | 10/2007 |
| JP | 2000346284 | 12/2000 |
| JP | 2004102152 | 4/2004 |
| TW | M290962 | 5/2006 |
| TW | M381256 | 5/2010 |

OTHER PUBLICATIONS

"First Office Action of China counterpart application" with English translation thereof, issued on Mar. 12, 2013, p. 1-p. 13.
"Office Action of China Counterpart Application", issued on Sep. 26, 2013, pp. 1-7.

* cited by examiner

*Primary Examiner* — Amy J Sterling
(74) *Attorney, Agent, or Firm* — Jianq Chyun IP Office

(57) ABSTRACT

A projection device including a turntable module and a projection module is provided. The turntable module includes a first turntable and a second turntable. The first turntable is disposed on a surface. The second turntable is disposed on the first turntable and connected to the first turntable, and rotates relative to the first turntable by revolving along a rotation axis. The projection module is disposed on the turntable module and fixed to the second turntable.

4 Claims, 4 Drawing Sheets

PROJECTION DEVICE

CROSS-REFERENCE TO RELATED APPLICATION

This application claims the priority benefit of China application serial no. 201010514756.X, filed on Oct. 18, 2010. The entirety of the above-mentioned patent application is hereby incorporated by reference herein and made a part of this specification.

BACKGROUND OF THE INVENTION

1. Field of the Invention

The invention relates to projection device and more particularly to a rotatable projection device.

2. Description of Related Art

A projector is a display device configured to generate a large size image. The imaging theory of the projector includes converting an illumination beam generated by a light source module into an image beam through a light valve, and then projecting the image beam onto a screen or a wall through a lens to generate an image. With the advancement of projection technology and the reduction of fabrication cost, the use of projector has gradually expanded from commercial use to family use.

When the user wants to change the projection direction of the projector, the user needs to move the projector and may therefore result in collision or impact of the projector. Some of the projectors are constituted by two machine bodies that rotate relative to each other. The user rotates one of the machine bodies having a projection lens to alter the projection direction. Nevertheless, when the user rotates the machine bodies relative to each other, the projection of the projector has to be paused and the use thereof is not as convenient.

Taiwan Patent No. M290962 discloses a structure of an advanced hanger for installing a projector on the ceiling. The hanger allows the projector to rotate 360°; however, the operation of angle rotation is not convenient to the user. US Pub. Patent No. 20070146651 discloses a projector having a rotatable lens. However, the rotation device is built-in in the projector and the projector has to undergo maintenance once the rotation device is defective. US Pub. Patent No. 20100039627 discloses a suspended projection device. A projector thereof is pivoted to a suspension arm for rotation. Nevertheless, the suspension aim occupies a lot of space when extended and does not satisfy the trend of miniaturization in projection devices.

SUMMARY OF THE INVENTION

The invention is directed to a projection device, where a projection module is capable of rotating freely through a turntable module.

The advantages of the invention are further illustrated from the technical characteristics disclosed in the invention.

To attain one or a portion or all of the objectives aforementioned or other objectives, one embodiment of the invention provides a projection device including a turntable module and a projection module. The turntable module includes a first turntable and a second turntable. The first turntable is disposed on a surface. The second turntable is disposed on the first turntable and connected to the first turntable. The second turntable rotates relative to the first turntable by revolving along a rotation axis. The projection module is disposed on the turntable module and fixed to the second turntable.

The projection device further includes a pad disposed between the first turntable and the second turntable. The second turntable has a protrusion portion contacted the pad. When the second turntable rotates relative to the first turntable, the protrusion portion slides along the pad.

In the projection device, the first turntable has an annular rib and the second turntable has an annular groove. The annular rib is slidably disposed in the annular groove. The second turntable rotates relative to the first turntable by revolving along the rotation axis through the sliding of the annular rib in the annular groove.

In the projection device, one of respective sidewalls of the annular groove has a latch and the latch limits the annular rib to remain in the annular groove.

The projection device further includes a pad disposed on the annular rib. The annular groove has a protrusion portion located between the sidewalls and contacting the pad. When the second turntable rotates relative to the first turntable, the protrusion portion slides along the pad.

In the projection device, the first turntable has a spherical structure and the second turntable has a spherical groove. The spherical structure may be disposed in the spherical groove appropriately. The second turntable rotates relative to the first turntable by revolving along the rotation axis or tilts toward the rotation axis through the rolling of the spherical structure in the spherical groove.

In the projection device, the second turntable has a tenon and the projection module is fixed to the second turntable through the tenon.

In the projection device, a bottom portion of the first turntable has a foot pad. When the second turntable rotates relative to the first turntable, the friction between the foot pad and the surface stops the first turntable from moving relative to the surface.

In light of the foregoing, in the embodiments of the invention, the projection module is fixed to the second turntable of the turntable module so as to change a projecting direction along with the rotation operation of the second turntable relative to the first turntable. Since the rotation operation of the turntable module and the projection function of the projection module are independent, the projection module may project while the turntable module operates. The use of the projection device is thus more convenient.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the teens "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
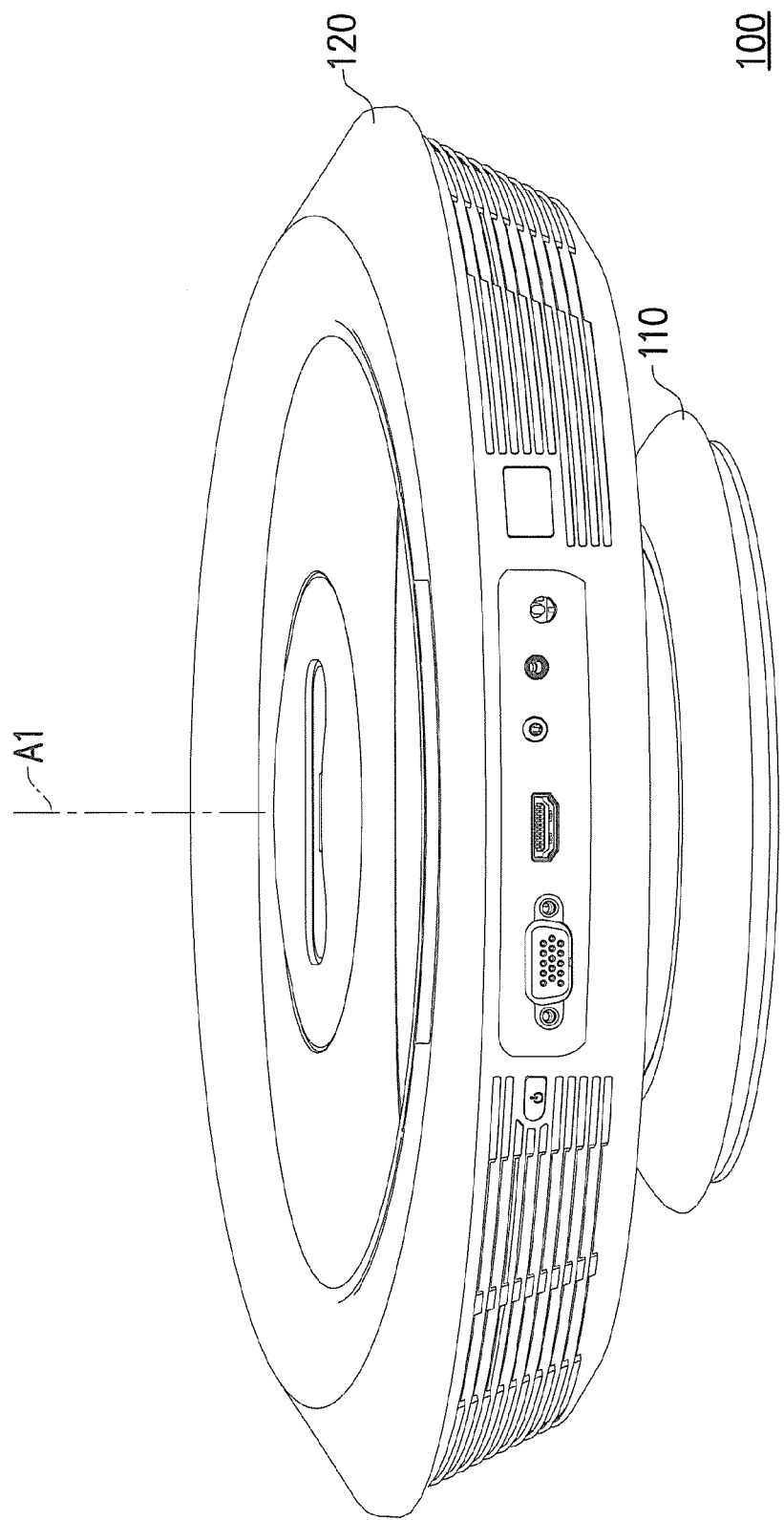
FIG. 1 is a three-dimensional diagram illustrating a projection device according to an embodiment of the invention.
Figure 2:
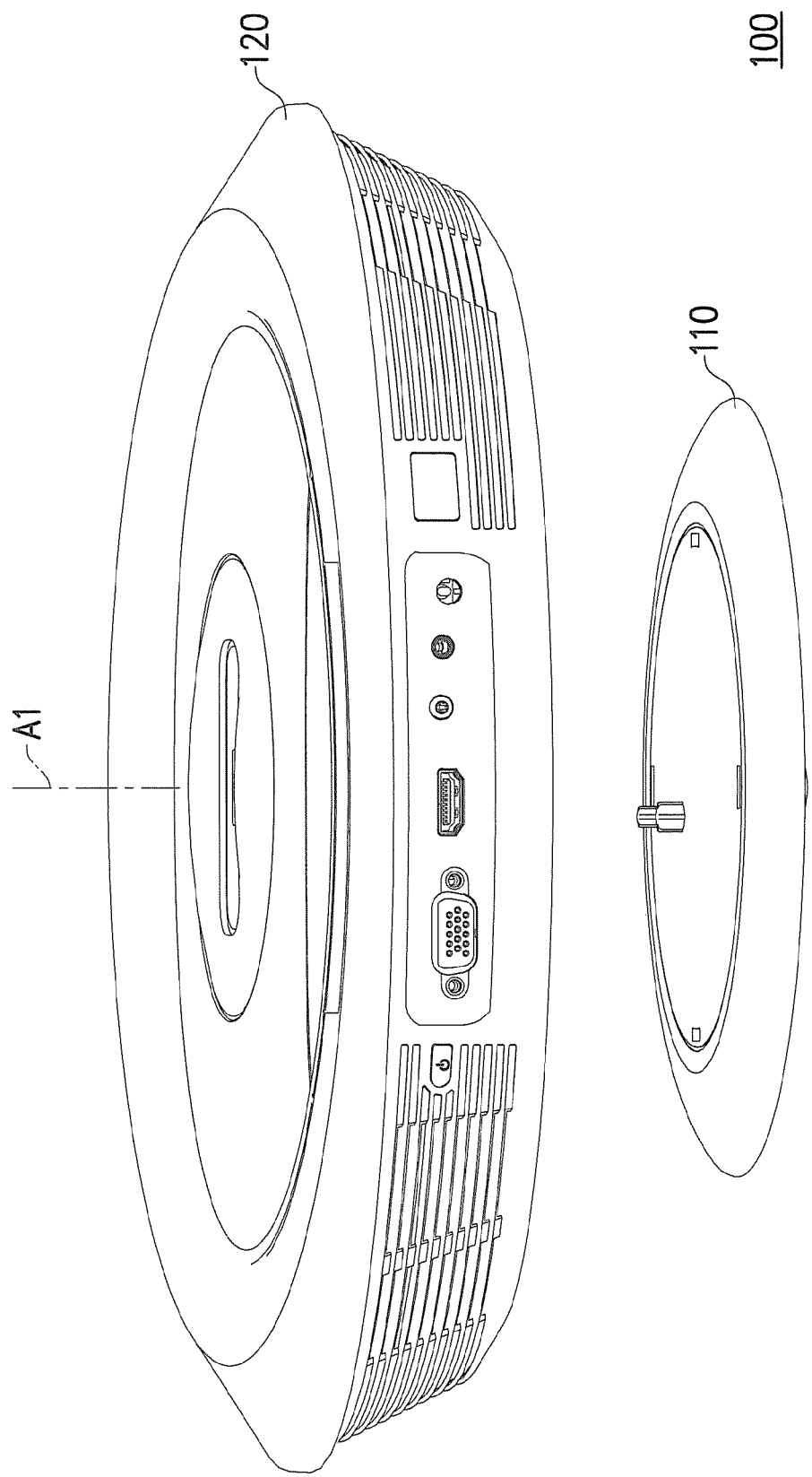
FIG. 2 is an explosion diagram illustrating the projection device in FIG. 1.
Figure 3:
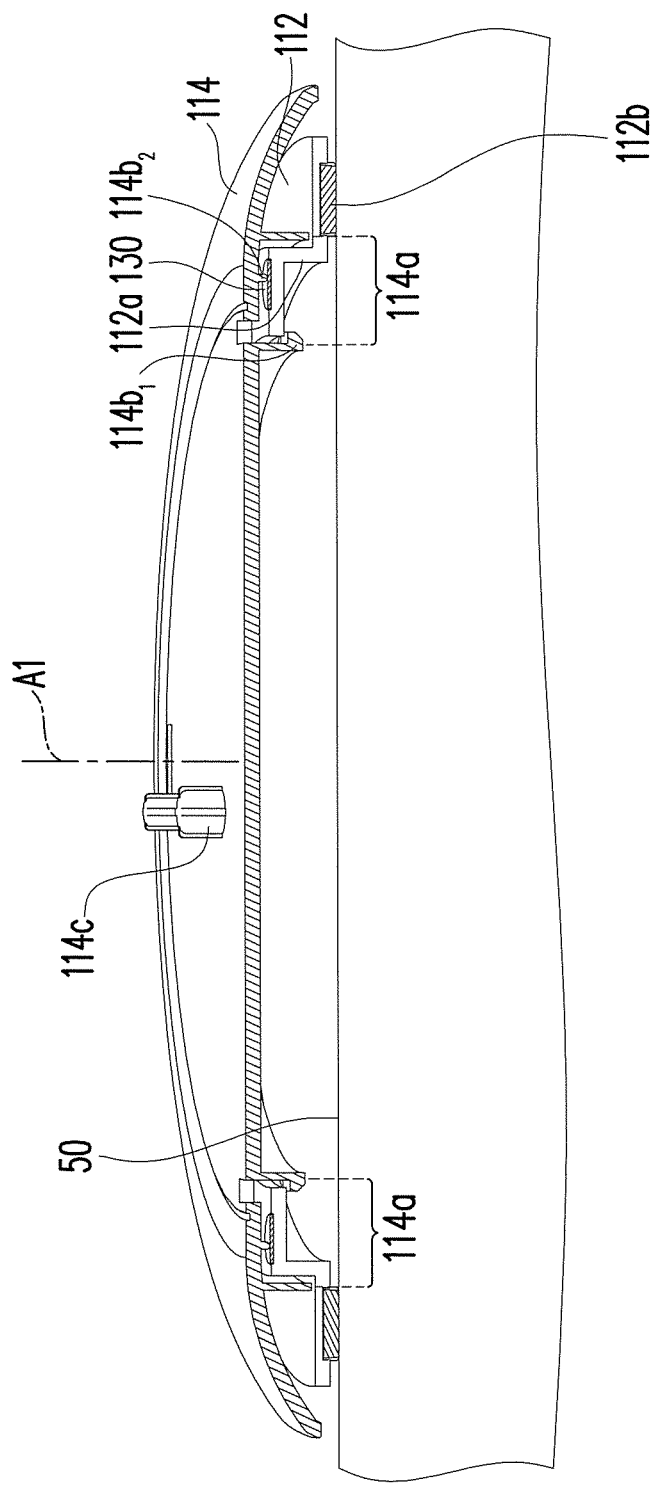
FIG. 3 is a cross-sectional view of a turntable module in FIG. 1.

Referring to FIGS. 1 to 3, a projection device 100 of the embodiment includes a turntable module 110 and a projection module 120. The turntable module 110 includes a first turntable 112 and a second turntable 114. The first turntable 112 is disposed on a surface 50. The surface 50 is a table top or other surface for disposing the projection device 100, for example.

The second turntable 114 is disposed on the first turntable 112 and rotatably connected to the first turntable 112. The second turntable 114 rotates relative to the first turntable 112 by revolving along a rotation axis A1. The projection module 120 is disposed on the turntable module 110 and fixed to the second turntable 114. In addition, the projection module 120 may be detached or replaced from the second turntable 114 due to user demands (i.e. damages of the turntable module 110 and so on). When the second turntable 114 rotates relative to the first turntable 112 along the rotation axis A1, a projecting direction of the projection module 120 may be altered. Under the disposition mentioned above, since the operation of the turntable module 110 and the projection function of the projection module 120 are independent, the projection module 120 may project while the turntable module 110 operates. The use of the projection device 100 is thus more convenient.

Referring to FIG. 3, the first turntable 112 of the embodiment has an annular rib 112a and the second turntable 114 has an annular groove 114a. The annular rib 112a is slidably disposed in the annular groove 114a. Accordingly, the second turntable 114 is capable of rotating clockwise or counter-clockwise 360° relative to the first turntable 112 by revolving along the rotation axis A1 through the annular rib 112a sliding along the annular groove 114a.

As aforementioned, in order to make the second turntable 114 rotate more stably relative to the first turntable 112, a position limiting unit structure may be disposed in the turntable module 110 in practice to enhance the stability of the turntable module 110 during the rotation. For example, one of two sidewalls of the annular groove 114a in the embodiment has a latch $114b_1$, and the latch $114b_1$ limits the annular rib 112a to remain in the annular groove 114a so as to prevent the detachment of the first turntable 112 and the second turntable 114.

In addition, in the embodiment, the projection device 100 further includes a pad 130. The pad 130 is disposed on the annular rib 112a. The annular groove 114a has a protrusion portion $114b_2$. The protrusion portion $114b_2$ is located between the sidewalls of the annular groove 114a and the protrusion portion $114b_2$ contacts the pad 130. When the second turntable 114 rotates relative to the first turntable 112, the protrusion portion $114b_2$ slides on the pad 130. Practically, the pad 130 is fabricated with a smooth material such as Teflon, so that the relative rotation between the first turntable 112 and the second turntable 114 is smoother.

Referring to FIG. 3, a tenon 114c is further disposed on the second turntable 114. In the embodiment, the projection module 120 is fixed to the second turntable 114 through the tenon 114c. The tenon 114a does not need to locate on the rotation axis A1 and may be tilted thereto. Additionally, a foot pad 112b may be disposed on the bottom of the first turntable 112. When the second turntable 114 rotates relative to the first turntable 112, the friction generated between the foot pad 112b and the surface 50 may stop the first turntable 112 from moving relative to the surface 50, such that unexpected displacement of the projection device 100 (marked in FIG. 1) is prevented. However, the invention does not limit the projection module 120 to be fixed on the second turntable 114 only through the tenon 114c. In other embodiments, the projection module 120 is fixed to the second turntable 114 through other fixation devices.

In the embodiment, the rotation axis A1, for instance, passes through a geometric center of the projection module 120. However, the invention is not limited thereto. In other embodiments, the rotation axis A1 may also offset from the geometric center of the projection module 120. Further, the invention does not limit the method of connecting the first turntable 112 and the second turntable 114. In the following, FIG. 4 is used as an example for illustration.

Figure 4:
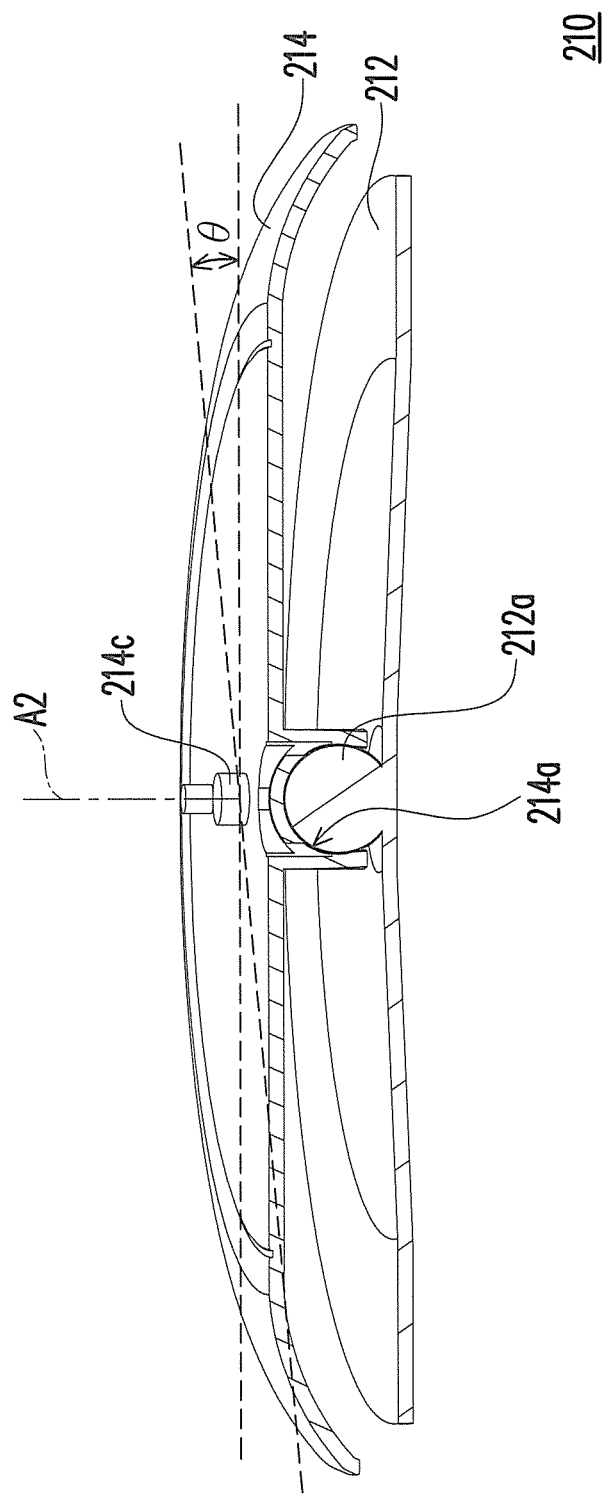
FIG. 4 is a cross-sectional view illustrating a turntable module according to another embodiment of the invention.

Referring to FIG. 4, in the embodiment, a first turntable 212 of a turntable module 210 has a spherical structure 212a and a second turntable 214 has a spherical groove 214a. The spherical structure 212a is disposed in the spherical groove 214a. Accordingly, the second turntable 214 rotates 360° relative to the first turntable 212 by revolving along a rotation axis A2 or tilts toward the rotation axis A2 through the spherical structure 212a rolling in the spherical groove 214a. Herein, the rotation direction is clockwise or counter-clockwise and the tilting angle θ is about 0° to 30°. Hence, the turntable module 210 has higher operation flexibility. In the embodiment, the spherical structure 212a of the embodiment and the first turntable 212 are formed as an integrative unit, for example. However, the invention is not limited thereto, and the spherical structure 212a may also be an independent component and assembled on the first turntable 212. Moreover, a tenon 214c may be disposed in the second turntable 214 of the embodiment, and the projection module 120 (shown in FIG. 2) may be fixed to the second turntable 214 through the tenon 214c, wherein the tenon 214c is located on the rotation axis A2.

In summary, in the embodiments of the invention, the projection module is fixed to the second turntable of the turntable module so as to change the projecting direction resulted from the rotation of the second turntable relative to the first turntable. Since the operation of the turntable module and the projection function of the projection module are independent, the projection module may project while the turntable module operates, thereby allowing more convenient usage of the projection device. Also, in the embodiments of the invention, the second turntable is suitable for rotating 360° relative to the first turntable, and the projection blind side that may not be avoided in the traditional projection may be solved. Additionally, in the embodiments of the invention, the pad configured to contact the second turntable may be disposed on the first turntable, so that the relative rotation between the first turntable and the second turntable becomes smoother.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection device, comprising:
   a turntable module, comprising:
      a first turntable, disposed on a surface and having an annular rib; and
      a second turntable, disposed on the first turntable and having an annular groove, connected to the first turntable, and rotating relative to the first turntable by revolving along a rotation axis, wherein the annular rib is slidably disposed in the annular groove, and the second turntable rotates relative to the first turntable by revolving along the rotation axis through the annular rib sliding in the annular groove;
   a projection module, disposed on the turntable module and fixed to the second turntable, wherein the second turntable has a tenon and the projection module is fixed to the second turntable through the tenon; and
   a pad, disposed on the annular rib, and the annular groove having a protrusion portion located between two opposite sidewalls of the annular groove and contacting the pad, wherein when the second turntable rotates relative to the first turntable, the protrusion portion slides along the pad.

2. The projection device as claimed in claim 1, wherein one of the two opposite sidewalls of the annular groove has a latch and the latch limits the annular rib to remain in the annular groove.

3. The projection device as claimed in claim 1, wherein the first turntable has a spherical structure and the second turntable has a spherical groove, the spherical structure is disposed in the spherical groove, and the second turntable rotates relative to the first turntable by revolving along the rotation axis or tilts toward the rotation axis through the spherical structure rolling in the spherical groove.

4. The projection device as claimed in claim 1, wherein a bottom portion of the first turntable has a foot pad, and when the second turntable rotates relative to the first turntable, a friction between the foot pad and the surface stops the first turntable from moving relative to the surface.

* * * * *